Figure 2A:
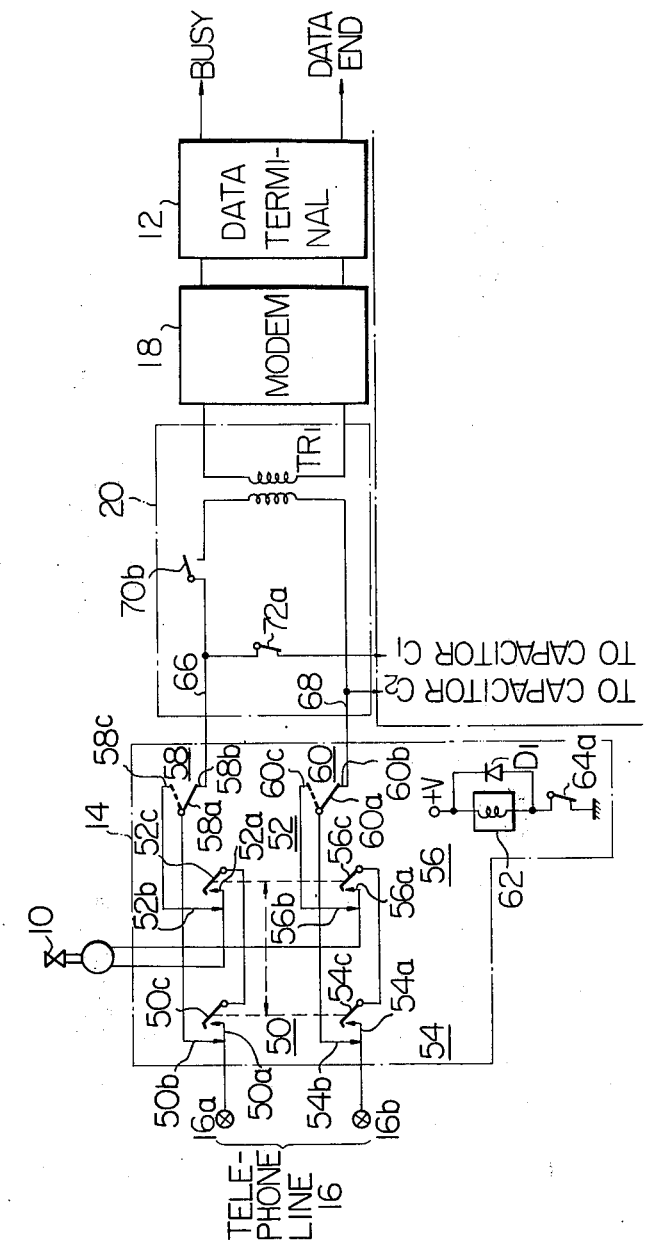

United States Patent [19]

Hashimoto

[11] 3,962,546
[45] June 8, 1976

[54] MALFUNCTION DETECTION AND CHANGEOVER APPARATUS FOR DATA COMMUNICATIONS SYSTEM

[75] Inventor: Takemi Hashimoto, Tokyo, Japan

[73] Assignee: Ricoh Co., Ltd., Tokyo, Japan

[22] Filed: Oct. 29, 1974

[21] Appl. No.: 518,825

[30] Foreign Application Priority Data
Dec. 13, 1973  Japan.............................. 48-140740

[52] U.S. Cl. ............................................. 179/2 DP
[51] Int. Cl.² ........................................ H04M 11/04
[58] Field of Search................. 179/2 DP, 2 R, 1 C, 179/2 A, 2 C, 3, 4, 5 R; 340/149 A, 150, 152 R

[56] References Cited
UNITED STATES PATENTS

| | | |
|---|---|---|
| 2,828,362 | 3/1958 | Darwin et al..................... 179/2 DP |
| 3,475,557 | 10/1969 | Morse et al....................... 179/2 DP |
| 3,524,935 | 8/1970 | Gonsewski......................... 179/2 DP |
| 3,739,338 | 6/1973 | Jacobson et al.................. 179/2 DP |
| 3,787,623 | 1/1974 | Stephenson....................... 179/2 DP |

*Primary Examiner*—Kathleen H. Claffy
*Assistant Examiner*—George G. Stellar
*Attorney, Agent, or Firm*—Frank J. Jordan

[57] ABSTRACT

A data terminal is connected to a telephone line for data transmission and reception. When a malfunction is detected in the data terminal, the data terminal is automatically disconnected from the telephone line and a telephone set connected to the telephone line. After a predetermined time interval, the telephone set is automatically disconnected from the telephone line and the data terminal re-connected to the telephone line.

3 Claims, 4 Drawing Figures

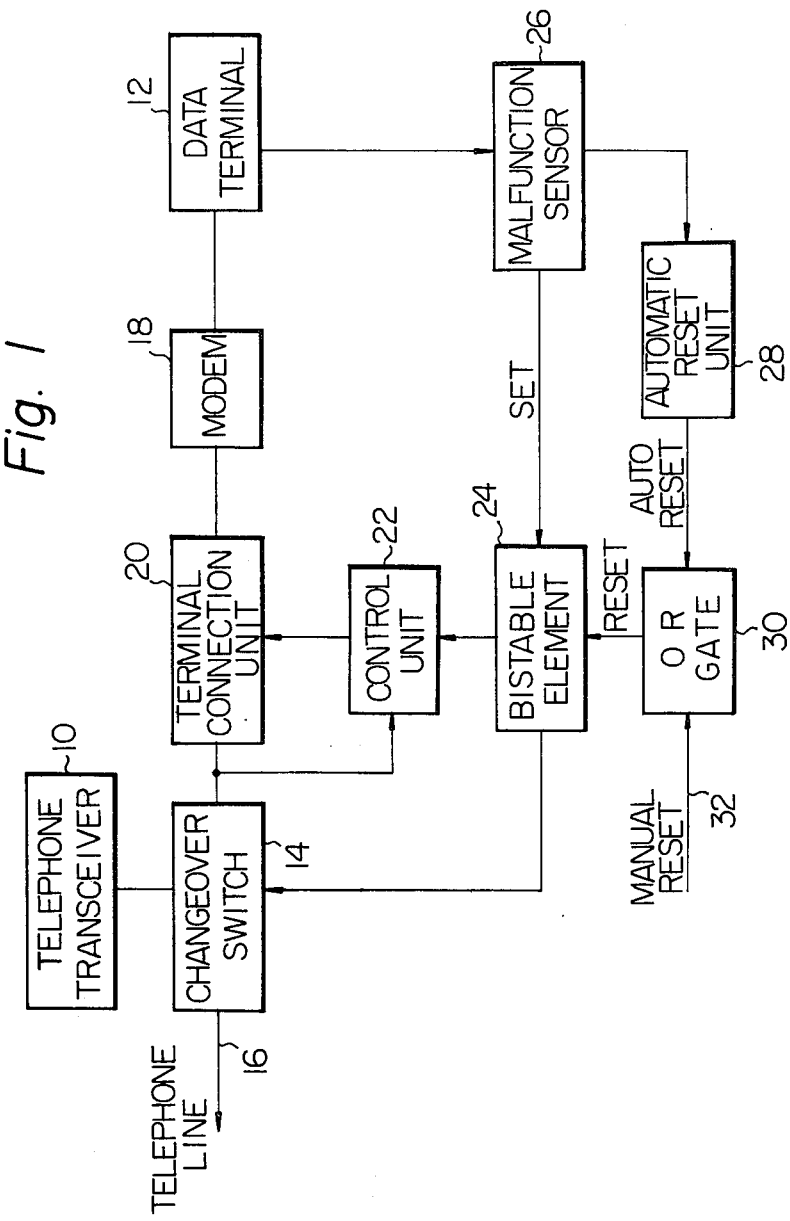

MALFUNCTION DETECTION AND CHANGEOVER APPARATUS FOR DATA COMMUNICATIONS SYSTEM

The present invention relates to a method and apparatus for detecting a malfunction in a data terminal connected to a telephone line for transmission and automatically disconnecting the data terminal from the telephone line and connecting a telephone set to the telephone line when a malfunction is detected.

A telephone set or transceiver which is well known in the art comprises a transmitter, a receiver, a hook switch, a dial and a ringer, and is connected to a subscriber telephone line for aural transception of information. Data transmission systems have recently been devised which utilize the same subscriber telephone lines as the conventional telephone transceivers and are extremely convenient because no special transmission lines are required. Such systems include time sharing computer networks in which remotely located teletype style computer terminals communicate with a central large sized computer. Another example is a facsimile transmission system. In such a facsimile system, when it is desired to transmit graphic information from an originator to a receiver, the document to be transmitted is placed in the originator's facsimile device or data terminal and the intended receiver is called using the telephone transceiver. When the receiver answers, the facsimile devices of both the originator and receiver are connected to the telephone line and the electrical signals representing the information on the document are transmitted from the originator to the receiver as is well known in the art. If desired, the telephone transceivers may be omitted and the facsimile devices permanently connected to the telephone line. In this case, facsimile devices are provided with means for automatically calling and being called by other stations.

A problem is involved in prior art data transmission systems of the type described above in that if a malfunction occurs in a data terminal during transmission, not only is data transmission impossible but the terminal is tied up and cannot be called by another terminal. The present invention also relates to the type of malfunction which occurs in the transmission of the data rather than the actual mechanism of the data terminal. An example of such a malfunction in a facsimile system is noise in the transmitted output which results in distorted reproduction at the receiving terminal and possibly loss of synchronization.

It is therefore an object of the present invention to provide a method of detecting a malfunction in data transmission over a telephone line, disconnecting the faulty terminal from the telephone line and connecting an associated standard telephone transceiver unit to the telephone line in place of the faulty data terminal.

It is another object of the present invention to provide the above described method further comprising re-connecting the data terminal to the telephone line after a predetermined length of time.

It is another object of the present invention to provide apparatus embodying the above described methods.

Figure 2B:
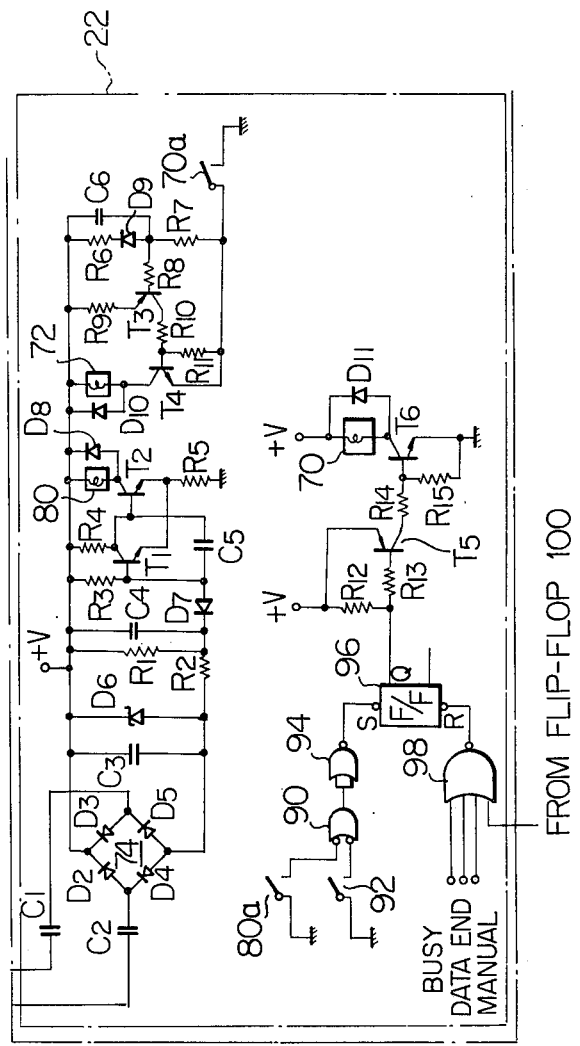
Figure 2C:
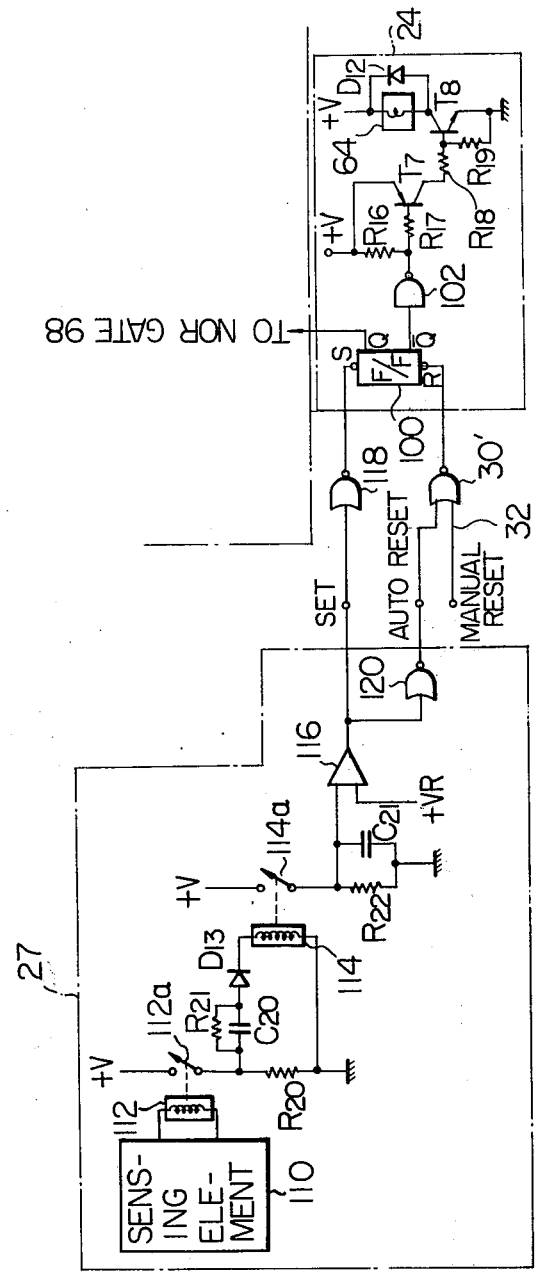

The above and other objects, features and advantages of the present invention will become clear from the following description taken with the accompanying drawings, in which:

FIG. 1 is a block diagram of a data transmission station embodying the present invention; and FIG. 2 comprised of 2a–2c shows a schematic circuit diagram, partly in block form, of the data transmission station shown in FIG. 1.

Referring now to FIG. 1, a data transmission station embodying the present invention comprises a standard telephone transceiver or set 10 having a transmitter, receiver, hook switch, dial and ringer (not shown). A data terminal 12 may be a teletype terminal, time sharing computer system remote terminal, facsimile transceiver or the like. A changeover switch 14 is provided to selectively connect one or the other of the telephone set 10 and the data terminal 12 to a subscriber telephone line 16 associated with the telephone set 10. The data terminal 12 is connected to the changeover switch 14 through a modem 18 and a terminal connection unit 20. The terminal connection unit 20 is controlled by a control unit 22 to connect or disconnect the modem 18 and the changeover switch 14. The control unit 22 has an input connected to the junction between the changeover switch 14 and the terminal connection unit 20. The control unit 22 and changeover switch 14 are controlled by a holding means or bistable element 24. A malfunction sensor 26 is connected to detect a malfunction in the data terminal 12, and provides a set input to the bistable element 24. The malfunction sensor 26 also controls an automatic reset unit 28 which provides an automatic reset input to an OR gate 30. The OR gate 30 also has a manual reset input and provides a reset input to the bistable element 24.

The malfunction sensor 26 may be of any known type and is arranged to detect any selected mechanical or operational malfunction of the data terminal 12 which would cause failure or abnormal transmission or reception of data by the data terminal 12.

When the data terminal 12 is de-energized, the changeover switch 14 is also de-energized and connects the telephone set 10 to the telephone line 16. The terminal connection unit 20 is also de-energized and disconnects the modem 18 from the changeover switch 14.

When the data terminal 12 is energized, all other units shown in FIG. 1 are energized and the data transmission station is in a standby status. The bistable element 24 is reset to provide a logically negative output with the changeover switch 14 connecting the telephone line 16 to the terminal connection unit 20 and control unit 22. The terminal connection unit 20, however, still disconnects the changeover switch 14 from the modem 18. To call an intended receiver, the changeover switch 14 is manually changed to connect the telephone set 10 to the telephone line 16 and actuate the control unit 22 to cause the terminal connection unit 20 to connect the changeover switch 14 to the modem 18. The dial of the telephone set 10 is used to dial the receiver's number. If desired, automatic means may be provided in the data terminal 12 for producing dialing pulses rather than the dial of the telephone set 10, although not shown or described in detail. When the receiver answers and connects this data terminal (not shown) to the telephone line 16, the changeover switch 14 is manually changed to connect the telephone line 16 to the terminal connection unit 20. The data terminal 12 is then actuated to begin transmission through the modem 18 and telephone line 16.

When the transmission station is in the standby status and an external originator dials the number of the station, a 16 Hz call signal is produced which is sensed by the control unit 22. The control unit 22 then causes the terminal connection unit 20 to connect the changeover switch 14 to the modem 18 so that the data terminal 12 may receive data through the telephone line 16 and modem 18.

If, during either transmission or reception of data by the data terminal 12, a malfunction is detected by the malfunction sensor 26, the sensor 26 feeds a set signal to the bistable element 24 to set the same. The bistable element 24 then produces a logically positive output which causes the changeover switch 14 to connect the telephone line 16 to the telephone set 10 and causes the control unit 22 to control the terminal connection unit 20 to disconnect the changeover switch 14 from the modem 18. Since the hook switch (not shown) of the telephone set 10 is open, the telephone circuit will be broken. Also, if the data terminal 12 is provided with a meter (not shown) for measuring the transmission time for billing purposes, the meter will be de-energized.

In response to the sensed malfunction, the malfunction sensor 26 also feeds a signal to the automatic reset unit 28, which in turn feeds an automatic reset signal to the OR gate 30 after a predetermined time interval or delay such as 30 seconds. The OR gate 30 feeds the reset signal to the bistable element 24 to reset the same, and the transmission station is returned to the standby status with the terminal connection unit 20 connected to the telephone line 16 through the changeover switch 14. A manual reset input to the OR gate 30 within the predetermined time interval will also reset the system to the standby status.

The provision of the automatic reset unit 28 is especially advantageous in the case of a transmission rather than a mechanical malfunction, and may be omitted if desired.

Referring now to FIG. 2, the transmission station is shown in greater detail. A slight modification is disclosed in FIG. 2, in that the malfunction sensor 26 and automatic reset unit 28 are combined into a single malfunction control unit 27 which produces both the set and automatic reset signals when a malfunction is sensed.

The telephone line 16 comprises two leads 16a and 16b which are connected to make-before-brake contacts 50a and 54a of switches 50 and 54. In the standby state shown, the contacts 50a and 54a are urged into contact with fixed contacts 50b and 54b respectively, which are connected to movable contacts 58a and 60a of switches 58 and 60 respectively. Movable contacts 50c and 54c of the switches 50 and 54 are connected to movable contacts 52c and 56c of switches 52 and 56 respectively. Resilient contacts 52a and 56a of the switches 52 and 56 respectively are connected to the two leads (no numerals) of the telephone set 10, and are urged into engagement with fixed contacts 52b and 56b of the switches 52 and 56 respectively. The contacts 52b and 56b are connected to fixed contacts 58c and 60c of the switches 58 and 60 respectively. Fixed contacts 58b and 60b of the switches 58 and 60 are connected to lines 66 and 68 respectively leading to the terminal connection unit 20. The switches 58 and 60 are controlled by a relay coil 62 connected in series with normally closed relay contacts 64a between a positive DC source +V (not shown) and ground. A diode $D_1$ is connected in parallel with the relay coil 62 with the cathode connected to the source +V so as to be normally reverse biased.

In the standby status, the switches 50, 52, 54, 56, 58 and 60 are in the positions shown in solid line with the source +V energized and the relay contacts 64a closed. The telephone line 16 is connected to the switches 58 and 60 with the lead 16a connected to the movable contact 58a of the switch 58 through the contacts 50a and 50b. Similarly, the lead 16b is connected to the movable contact 60a of the switch 60 through the contacts 54a and 54b. To originate a call or utilize the telephone set 10 in the normal manner, the switches 50, 52, 54 and 56, which are ganged together for unitary operation, are manually or automatically (in response to a signal from the data terminal 12 by any known means not described herein) changed so that the contacts 50c, 52c, 54c and 56c engage with the contacts 50a, 52a, 54a and 56a and move the same out of engagement with the contacts 50b, 52b, 54b and 56b respectively. This disconnects the telephone line 16 from the switches 58 and 60 and connects the lead 16a to one lead of the telephone set 10 through the contacts 50a, 50c, 52c and 52a. Similarly, the lead 16b is connected to the other lead of the telephone set 10 through the contacts 54a, 54c, 56c and 56a.

With the switches 50, 52, 54, 56, 58 and 60 in the positions shown, if the source +V is de-energized or the relay contacts 64a are opened in response to a sensed malfunction in the data terminal 12 (as will be described in detail below), the contacts 58a and 60a are moved to the broken line positions into engagement with the fixed contacts 58c and 60c. In this case, the lead 16a is connected to one lead of the telephone set 10 through the contacts 50a, 50b, 58a, 58c, 52b and 52a. Similarly, the lead 16b is connected to the other lead of the telephone set 10 through the contacts 54a, 54b, 60a, 60c, 56b and 56a.

The primary winding of a coupling transformer $TR_1$ is connected in series with normally open relay contacts 70b across the lines 66 and 68. The secondary winding of the transformer $TR_1$ is connected to the modem 18, which is in turn connected to the data terminal 12.

The line 66 is connected through normally closed relay contacts 72a and a coupling capacitor $C_1$ to an input of a full wave bridge rectifier 74 comprising diodes $D_2$ to $D_5$. The line 68 is connected through a coupling capacitor $C_2$ to the other input of the rectifier 74. A filter capacitor $C_3$ and a zener diode $D_6$ are connected in parallel with each other across the outputs of the rectifier 74, with the cathode of the zener diode $D_6$ connected to the source +V. Resistors $R_1$ and $R_2$ are connected in series across the zener diode $D_6$, and a capacitor $C_4$ is connected in parallel with the resistor $R_1$. A resistor $R_3$ is connected at one end to the source +V and at the other end to the base of an NPN transistor $T_1$. A diode $D_7$ is connected at its anode to the base of the transistor $T_1$ and at its cathode to the junction between the resistors $R_1$ and $R_2$. The collector of the transistor $T_1$ is connected to the base of an NPN transistor $T_2$, to the source +V through a resistor $R_4$ and to the anode of the diode $D_7$ through a capacitor $C_5$. The transistors $T_1$ and $T_2$ are connected in an emitter coupled arrangement with the emitters of both transistors $T_1$ and $T_2$ grounded through a common resistor $R_5$. The collector of the transistor $T_2$ is connected to the source +V through the parallel combination of a relay coil 80 and a diode $D_8$, with the cathode of the diode $D_8$ connected to the source +V.

The resistors $R_1$ and $R_2$ and capacitor $C_4$ constitute a first time constant circuit. With all switches and relay contacts in the positions shown in FIG. 2, when a 16 Hz ringing signal is applied to the telephone line 16, the same appears at the inputs of the rectifier 74. The rectified ringing signal is smoothed by the capacitor $C_3$ and charges the capacitor $C_4$ through the resistor $R_2$. The circuit arrangement including the transistors $T_1$ and $T_2$ as the active elements constitutes a voltage level sensor and relay driver adapted to energize the relay coil 80 when the base voltage of the transistor $T_1$ is above a predetermined level. Through selection of the time constant of the circuit, the voltage across the capacitor $C_3$ will reach the predetermined value causing the transistors $T_1$ and $T_2$ to conduct at a selected time interval after the ringing signal is initiated to energize the relay coil 80, as will be described further below.

One end of a capacitor $C_6$ is connected to the source +V, and the other end thereof is connected to ground through a resistor $R_7$ and normally open relay contacts 70a respectively. One end of a resistor $R_6$ is connected to the source +V, and the other end is connected to the cathode of a diode $D_9$, the anode of which is connected to the junction of the capacitor $C_6$ and the resistor $R_7$. The anode of the diode $D_9$ is also connected through a resistor $R_8$ to the base of a PNP transistor $T_3$, the emitter of which is connected to the source +V through a resistor $R_9$. The collector of the transistor $T_3$ is connected to the junction between the resistor $R_7$ and the relay contacts 70a through resistors $R_{10}$ and $R_{11}$ respectively. The junction between the resistors $R_{10}$ and $R_{11}$ is connected to the base of an NPN transistor $T_4$, the emitter of which is connected to the junction between the resistor $R_{11}$ and relay contacts 70a. The collector of the transistor $T_4$ is connected to the source +V through the parallel combination of a relay coil 72 and a diode $D_{10}$, with the cathode of the diode $D_{10}$ connected to the source +V.

The resistors $R_6$ and $R_7$ and capacitor $C_6$ constitute a second time constant circuit, and the circuit arrangement including the transistors $T_3$ and $T_4$ as the active elements constitutes a voltage level sensor and relay driver similar to that of the transistors $T_1$ and $T_2$. In operation, when the relay contacts 70a are closed, the capacitor $C_6$ will charge through the resistor $R_7$ at a rate determined by the time constant of the circuit. When the voltage across the capacitor $C_6$ reaches another predetermined level, the transistors $T_3$ and $T_4$ will conduct to energize relay coil 72 at a selected time interval after the relay contacts 70a are closed.

Normally open relay contacts 80a actuated by the relay coil 80 are connected between ground and an inverting input of an OR gate 90. A switch 92, which is ganged with the switches 50, 52, 54 and 56 for unitary operation therewith, is connected between ground and another inverting input of the OR gate 90. The output of the OR gate 90 is connected through an inverter 94 to an inverting set input S of a bistable element of flip-flop 96, corresponding to the bistable element 24 shown in FIG. 1. A normal output Q of the flip-flop 96 is connected through a resistor $R_{13}$ to the base of a PNP transistor $T_5$ and also to the source +V through a resistor $R_{12}$. The emitter of the transistor $T_5$ is connected directly to the source +V, and the collector thereof is grounded through resistors $R_{14}$ and $R_{15}$ respectively. The junction of the resistors $R_{14}$ and $R_{15}$ is connected to the base of an NPN transistor $T_6$, the emitter of which is grounded. The collector of the transistor $T_6$ is connected to the source +V through the parallel combination of relay coil 70 and a diode $D_{11}$, with the cathode of the diode $D_{11}$ connected to the source +V. The relay coil 70 is arranged to actuate the relay contacts 70a and 70b. In operation, when the output Q of the flip-flop 96 is logically positive, the transistors $T_5$ and $T_6$ will conduct to energize the relay coil 70.

The output of a NOR gate 98 is connected to an inverting reset input of the flip-flop 96, and an input to the NOR gate 98 is connected to a normal output Q of another bistable element of flip-flop 100. Other inputs of the NOR gate 98 receive busy and data end signals from the data terminal 12 and a manual signal.

An inverting output $\bar{Q}$ of the flip-flop 100 is connected to the input of an inverter 102, the output of which is connected to the base on a PNP transistor $T_7$ through a resistor $R_{17}$ and also to the source +V through $R_{16}$. The emitter of the transistor $T_7$ is connected directly to the source +V, and the collector thereof is grounded through resistors $R_{18}$ and $R_{19}$ respectively. The junction of the resistors $R_{18}$ and $R_{19}$ is connected to the base of an NPN transistor $T_8$, the emitter of which is grounded. The collector of the transistor $T_8$ is connected to the source +V through the parallel combination of a relay coil 64 and a diode $D_{12}$, with the cathode of the diode $D_{12}$ connected to the source +V. The relay coil 64 is arranged to actuate the relay contacts 64a. In operation, when the inversion output $\bar{Q}$ is logically positive, the transistors $T_7$ and $T_8$ conduct to energize the relay coil 64.

The malfunction control unit 27 comprises a sensing element 110 operative to detect any selected malfunction of the data terminal 12 and produce an output signal to energize a relay coil 112 in response thereto. One end of a resistor $R_{20}$ is grounded, and the other end thereof is connected to the source +V through normally open relay contacts 112a actuated by the relay coil 112. The anode of a diode $D_{13}$ is connected to the junction of the resistor $R_{20}$ and relay contacts 112a through the parallel combination of a resistor $R_{21}$ and a capacitor $C_{20}$. The cathode of the diode $D_{13}$ is grounded through a relay coil 114. One end of a resistor $R_{22}$ is grounded, and the other end thereof is connected to the source +V through normally open relay contacts 114a actuated by the relay coil 114. A capacitor $C_{21}$ is connected in parallel with the transistor $R_{22}$. The junction between the capacitor $C_{21}$ and the relay contacts 114a is connected to one input of a comparator 116, the other input of which is connected to a reference voltage source +VR (not shown). The output of the comparator 116 is connected through an inverter 118 to an inverting set input S of the flip-flop 100, and also through an inverter 120 to an input of a NOR gate 30', which serves the function of the OR gate 30 shown in FIG. 1. The output of the NOR gate 30 is connected to an inverting reset input R of the flip-flop 100.

In operation, when a malfunction is sensed by the sensing element 110, the relay coil 112 is energized thereby to close the relay contacts 112a. A large initial surge of current flows through relay contacts 112a, capacitor $C_{20}$, resistor $R_{21}$, diode $D_{13}$ and relay coil 114 to energize the relay coil 114 and close the relay contacts 114a. The current through the relay coil 114 decreases to a low value as the capacitor $C_{20}$ charges, which is finally determined by the current flow through the resistor $R_{21}$ and relay coil 114 only when the capacitor $C_{20}$ is fully charged. The circuit parameters are selected so that the current through the resistor $R_{21}$ and relay coil 114 only is insufficient to energize the relay coil 114. In this manner, the relay coil 114 is energized for only a selected time period after the relay contacts 112a are close, even though the contacts 112a remain closed. This is because the current through the relay coil 114, which is initially sufficient to energize the relay coil 114, drops below the minimum energization level for the relay coil 114 after the selected time period due to charging of the capacitor $C_{20}$. The resistor $R_{21}$ serves to discharge the capacitor $C_{20}$ when the malfunction is restored and the relay contacts 112a are opened, and the diode $D_{13}$ prevents discharge of the capacitor $C_{20}$ through relay coil 114.

Momentary closing of the relay contacts 114a results in the voltage of the source +V being applied to the input of the comparator 116, which is selected to be higher than the voltage of the reference source +VR. The output of the comparator 116 is logically positive, and is inverted twice by the inverter 118 and inverting set input S of the flip-flop 100 respectively so that the flip-flop 100 is set. The logically positive output of the comparator 116 is inverted three times by the inverter 120, the NOR gate 30, and the inverting reset input R of the flip-flop 100 so that the signal applied to the inverting reset input R has no effect on the flip-flop 100.

When the relay contacts 114a are closed, the capacitor $C_{21}$ is charged to the voltage of the source +V almost instantaneously. When the relay contacts 114a are subsequently opened, the capacitor $C_{21}$ will discharge through the resistor $R_{22}$ at a rate determined by the time constant of the circuit. When the voltage across the capacitor $C_{21}$ drops below the voltage of the reference source +VR, the output of the comparator 116 will become logically negative. The input to the reset input R of the flip-flop 100 then becomes logically positive to reset the flip-flop 100, as the negative input to the set input S has no effect on the flip-flop 100. In this manner, the automatic reset signal is produced at a desired predetermined time interval after the set signal is produced.

The overall operation of the transmission station will now be described with reference to FIG. 2 and the above detailed description of the operation of the individual circuits.

When the data terminal 12 is de-energized, the voltage source +V is also de-energized and all relay coils are thereby de-energized. The switches 50, 52, 54, 56 and 92 are in the positions shown. Since the relay coil 62 is de-energized, however, the switches 58 and 60 are released to assume the broken line positions to connect the telephone line 16 to the telephone set 10 as described above. When the data terminal 12 is energized, the voltage source +V is also energized and the relay coil 62 is energized. The switches 58 and 60 assume their solid line positions to connect the telephone line 16 to the terminal connection unit 20. This is the standby status described above with reference to FIG. 1, and all switches are in the positions shown in FIG. 2.

To call another data terminal over the telephone line 16, the switches 50, 52, 54 and 56 are changed as a unit to connect the telephone line 16 to the telephone set 10. This may be done either manually or automatically by means provided in the data terminal 12. The switch 92, which is ganged to the switches 50, 52, 54 and 56 is closed, and a set signal is applied to the flip-flop 96 to set the same and energize the relay coil 70. As a result, the relay contacts 70a and 70b are closed. Closure of the relay contacts 70b connects the lines 66 and 68 through the primary of the transformer $TR_1$. Closure of the contacts 70a energizes the relay coil 72 as described above, which opens the relay contacts 72a to disconnect the rectifier 74 from the line 66 after the predetermined time delay. When the called data terminal answers, the switches 50, 52, 54, 56 and 92 are then changed to assume the positions shown with the result that the telephone line 16 is connected to the modem 18 through the changeover switch 14 and terminal connection unit 20 as described above in reference to FIG. 1, and data transmission may be performed. If the called terminal is busy, a busy signal will be transmitted through the telephone line 16 and data terminal 12 to the data end input of the NOR gate 98 to reset the system to the standby status.

When the data terminal 12 is called over the telephone line 16, the ringing signal is processed as described above to energize the relay coil 80 after the desired time delay. As a result, the relay contacts 80a are closed to set the flip-flop 96. The relay coil 70 is thereby energized to close the contacts 70a and 70b. Subsequently, the relay coil 72 is energized after the time delay to open the relay contacts 72a to disconnect the rectifier 74 from the line 66. Closure of the relay contacts 70b completes the circuit between the telephone line 16 and the modem 18 as in the case of originating a call. Transmission of data may be subsequently performed. It will be noticed that during transmission of data, the system is in the same status whether the data terminal 12 originated or received the call.

To end data transmission at a desired time assuming that no malfunction has occurred, a data end signal is applied from the data terminal 12 to the input of the NOR gate 98 to reset the flip-flop 96. Alternatively, a manual input may be applied to the input of the NOR gate 98. Resetting of the flip-flop 96 results in the de-energization of the relay coil 70. Subsequently, the relay contacts 70a and 70b are opened. Opening of the relay contacts 70b results in breaking the telephone circuit through the lines 66 and 68 and the primary of the transformer $TR_1$. Opening of the contacts 70a results in the de-energization of the relay coil 72, which closes the contacts 72a to re-connect the rectifier 74 to the line 66. The system is thereby restored to the standby status to originate or receive another call.

When a malfunction is detected by the sensing element 110, the flip-flop 100 is set as described above by the set signal from the malfunction control unit 27. The logically positive output $\overline{Q}$ of the flip-flop 100 applied to the reset input R of the flip-flop 96 to reset the same, and the relay coil 70 is de-energized. The relay contacts 70a and 70b are thereby opened. Opening of the relay contacts 70b results in breaking the telephone circuit through the lines 66 and 68 and the primary of the transformer $TR_1$. Opening of the relay contacts 70a results in the de-energization of the relay coil 72, which closed the contacts 72a to re-connect the rectifier 74 to the line 66. The logically negative output Q of the flip-flop 100 is inverted by the inverter 102 to energize the relay coil 64 as described above. As a result, the relay contacts 64a are opened to de-energize the relay coil 62. Subsequently, the switches 58 and 60 assume their broken line positions to connect the telephone line 16 to the telephone set 10. After the selected time interval, the malfunction control unit 27 produces the automatic reset signal as described above to reset the flip-flop 100. As a result, the relay coil 64 is de-energized and the relay contacts 64*a* opened. The switches 58 and 60 are then returned to their solid line positions as shown, and the system is restored to the standby status. It will be understood that a manual reset signal applied to either the NOR gate 98 or the NOR gate 30 will restore the system to the standby status at any time during data transmission.

What is claimed is:

1. In a method of data transmission in which a data terminal is normally connected to a telephone line, the improvement comprising the steps of:
    a. sensing for the presence of a malfunction of the data terminal;
    b. disconnecting the data terminal from the telephone line and connecting a telephone set to the telephone line when a malfunction is sensed; and
    c. automatically disconnecting the telephone set from the telephone line and re-connecting the data terminal to the telephone line at a predetermined time interval after performing step (b).

2. In a data transmission station having a data terminal normally connected to a transmission line for transmission and a transeciver, the improvement comprising:
    changeover means operative to selectively connect the data terminal and transceiver to the transmission line; and
    sensing means operative to detect a malfunction of the data terminal and control the changeover means to disconnect the data terminal from the transmission line and connect the transceiver to the transmission line when a malfunction is detected, the sensing means being further operative to control the changeover means to disconnect the transceiver from the transmission line and re-connect the data terminal to the transmission line at a predetermined time interval after disconnecting the data terminal from the transmission line and connecting the transceiver to the transmission line.

3. In a data transmission station having a data terminal normally connected to a transmission line for transmission and a transceiver, the improvement comprising:
    changeover means operative to selectively connect the data terminal and the transceiver to the transmission line; and
    sensing means operative to detect a malfunction of the data terminal and control the changeover means to disconnect the data terminal from the transmission line and connect the transceiver to the transmission line when a malfunction is detected;
    the changeover means comprising a changeover switch and a bistable element, the changeover switch being arranged to selectively connect the data terminal and the transceiver to the transmission line and the bistable element being arranged to control the changeover switch, the bistable element normally being in a first state to control the changeover switch to connect the data terminal to the transmission line and being changed to a second state by the sensing means to control the changeover switch to connect the transceiver to the transmission line when a malfunction of the data terminal is sensed by the sensing means, the changeover means further comprising reset means arranged to reset the bistable element to the first state at a predetermined time interval after the bistable element is changed from the first state to the second state by the sensing means.

* * * * *